United States Patent
Schwartz et al.

(10) Patent No.: US 7,949,138 B2
(45) Date of Patent: May 24, 2011

(54) SECURE INSTANT MESSAGING

(75) Inventors: Eyal Schwartz, Bellevue, WA (US);
Peter S. Ford, Carnation, WA (US);
John S Holmes, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1066 days.

(21) Appl. No.: 11/172,425

(22) Filed: Jun. 30, 2005

(65) Prior Publication Data

US 2007/0003066 A1     Jan. 4, 2007

(51) Int. Cl.
H04L 9/08 (2006.01)
(52) U.S. Cl. ...................................... 380/286; 713/155
(58) Field of Classification Search .................. 709/206; 713/169, 168, 155; 380/277, 281, 285, 186
See application file for complete search history.

(56) References Cited

U.S. PATENT DOCUMENTS

| | | | |
|---|---|---|---|
| 6,445,797 B1 * | 9/2002 | McGough | 380/285 |
| 6,807,277 B1 * | 10/2004 | Doonan et al. | 380/281 |
| 6,918,035 B1 * | 7/2005 | Patel | 713/169 |
| 7,146,009 B2 * | 12/2006 | Andivahis et al. | 380/277 |
| 2003/0147536 A1 | 8/2003 | Andivahis et al. | |
| 2003/0172035 A1 | 9/2003 | Cronce et al. | |
| 2003/0204722 A1 | 10/2003 | Schoen et al. | |
| 2004/0034773 A1 | 2/2004 | Balabine et al. | |
| 2004/0088348 A1 | 5/2004 | Yeager et al. | |
| 2004/0093372 A1 | 5/2004 | Chen et al. | |
| 2004/0107124 A1 | 6/2004 | Sharpe et al. | |
| 2004/0128520 A1 * | 7/2004 | LaCous | 713/186 |
| 2004/0143738 A1 | 7/2004 | Savage et al. | |
| 2004/0168055 A1 | 8/2004 | Lord et al. | |
| 2004/0193680 A1 | 9/2004 | Gibbs et al. | |
| 2004/0221163 A1 | 11/2004 | Jorgensen et al. | |
| 2005/0074125 A1 | 4/2005 | Chavanne et al. | |
| 2005/0246529 A1 | 11/2005 | Hunt et al. | |
| 2006/0031351 A1 | 2/2006 | Marston et al. | |
| 2006/0106933 A1 | 5/2006 | Huang et al. | |
| 2006/0129814 A1 * | 6/2006 | Eun et al. | 713/168 |

(Continued)

FOREIGN PATENT DOCUMENTS

| | | |
|---|---|---|
| EP | 0998095 A2 | 5/2000 |
| RU | 2178913 C1 | 1/2002 |
| RU | 2184390 C1 | 6/2002 |
| WO | WO2004038565 A2 | 5/2004 |

OTHER PUBLICATIONS

Jian Yang; Interoperation support for electronic business; ACM, New York; vol. 43, Issue 6; Year of Publication: 2000 ; pp. 39-47.* "Decision on Grant Patent for Invention" for Russian Patent Application No. 2007149084 mailed on Nov. 19, 2010, 5 pgs.

*Primary Examiner* — Joseph Thomas
*Assistant Examiner* — Monjour Rahim
(74) *Attorney, Agent, or Firm* — Lee & Hayes, PLLC

(57) ABSTRACT

Secure instant messaging is described. In an embodiment, a messaging device encrypts a challenge identifier to generate an encrypted challenge message, and communicates the encrypted challenge message via a peer-to-peer communication link to a recipient messaging device. The recipient messaging device decrypts the encrypted challenge message and encrypts the challenge identifier as a return challenge identifier to generate an encrypted challenge return. The messaging device receives the encrypted challenge return from the recipient messaging device, decrypts the encrypted challenge return, and verifies that the return challenge identifier matches the challenge identifier to establish that communications are secure when communicated via the peer-to-peer communication link and, optionally, to establish control policies pertaining to a communication received at the recipient messaging device.

17 Claims, 7 Drawing Sheets

U.S. PATENT DOCUMENTS

| | | | |
|---|---|---|---|
| 2006/0168010 A1* | 7/2006 | Vill et al. | 709/206 |
| 2006/0206616 A1 | 9/2006 | Brown | |
| 2008/0209545 A1 | 8/2008 | Asano | |
| 2008/0256368 A1* | 10/2008 | Ross et al. | 713/193 |
| 2009/0217386 A1 | 8/2009 | Schneider | |
| 2009/0319638 A1 | 12/2009 | Faith et al. | |
| 2010/0268942 A1 | 10/2010 | Hernandez-Ardieta et al. | |

* cited by examiner

SECURE INSTANT MESSAGING

BACKGROUND

Instant messaging is ever increasing in popularity as users are able to communicate in real-time by way of instant messages using a variety of devices, such as computers, wireless phones, media devices, and the like. Instant messaging enables two or more users to exchange messages via a communication network during an instant messaging session. When two users are on-line at the same time, instant messages can be exchanged in real-time between the two users via respective messaging-enabled devices. Although the instant messages are a text conversation between the two users, the immediacy of message exchanges with instant messaging mimics how the users would participate in a typical spoken conversation.

The real-time instant message communications between two (or more) messaging-enabled devices can be implemented via a direct peer-to-peer communication link between the two messaging-enabled devices. In an alternative system, instant message communications may be routed from a client device to a server and then to a recipient client device, in which case the client-to-server and server-to-client communications can be secured. However, the peer-to-peer instant messaging conversations are not secure in transmission, nor is there validation that a user who participates in an instant messaging session is actually who they represent themselves to be. Instant messaging participants are then susceptible to being deceived and/or having data compromised.

SUMMARY

This summary is provided to introduce simplified concepts of secure instant messaging which is further described below in the Detailed Description. This summary is not intended to identify essential features of the claimed subject matter, nor is it intended for use in determining the scope of the claimed subject matter.

In an embodiment of secure instant messaging, a messaging device encrypts a challenge identifier to generate an encrypted challenge message, and communicates the encrypted challenge message via a peer-to-peer communication link to a recipient messaging device. The recipient messaging device decrypts the encrypted challenge message and encrypts the challenge identifier as a return challenge identifier to generate an encrypted challenge return. The messaging device receives the encrypted challenge return from the recipient messaging device, decrypts the encrypted challenge return, and verifies that the return challenge identifier matches the challenge identifier to establish that communications are secure when communicated via the peer-to-peer communication link.

In another embodiment of secure instant messaging, a messaging device establishes a peer-to-peer communication link for real-time communication of secure communications with a recipient messaging device, and establishes that encrypted communications are secure when communicating via the peer-to-peer communication link with the recipient messaging device. The messaging device can then encrypt a communication to generate an encrypted communication that includes a control policy to limit use of the communication when received and decrypted at the recipient messaging device. The control policy can designate the extent to which the recipient messaging device, or a user at the recipient messaging device, can maintain the communication for future reference, use the communication, and/or distribute the communication after being decrypted. The control policy may also preclude the distribution of the communication along with any additional data associated with the communication.

BRIEF DESCRIPTION OF THE DRAWINGS

The same numbers are used throughout the drawings to reference like features and components.

DETAILED DESCRIPTION

Secure instant messaging is described in which embodiments provide techniques to enable secure instant messaging communications. A messaging device can establish a peer-to-peer communication link with a recipient messaging device for real-time communication of secure communications, such as secure instant messages. The messaging device can also establish that encrypted communications, such as the instant messages, are secure when communicating via the peer-to-peer communication link with the recipient messaging device.

In an embodiment, digital rights management (DRM) is utilized to implement secure instant messaging. Digital rights management is a protocol that has been established for the copyright protection of digital media, such as to prevent the illegal distribution of paid content over the Internet and the on-line piracy of commercially marketed material. Digital rights management is also typically used to encrypt content that is then saved into a document. As applied to secure instant messaging, the digital rights management protocol provides at least identity validation, encryption key distribution, and encryption integration for real-time communications. Additionally, a digital rights management service implemented with secure instant messaging provides that identities of the messaging devices are inherently authenticated. A digital rights management service issues usage and issuance licenses only to known and authenticated identities.

A messaging device can establish that encrypted communications are secure with a recipient messaging device by first encrypting a randomly generated challenge identifier to generate an encrypted challenge. The encrypted challenge is then communicated to the recipient messaging device via the peer-to-peer communication link where the recipient messaging device decrypts the challenge. The recipient messaging device encrypts the challenge identifier in a response which is then returned to the messaging device. The messaging device decrypts the response and verifies that the received challenge identifier matches the challenge identifier that was initially sent to the recipient messaging device. This establishes that each of the messaging devices are secure in the other's identity, and that communications can be encrypted and securely communicated via the peer-to-peer communication link.

While aspects of the described systems and methods for secure instant messaging can be implemented in any number of different computing systems, environments, and/or configurations, embodiments of secure instant messaging are described in the context of the following exemplary system architectures.

Figure 1:
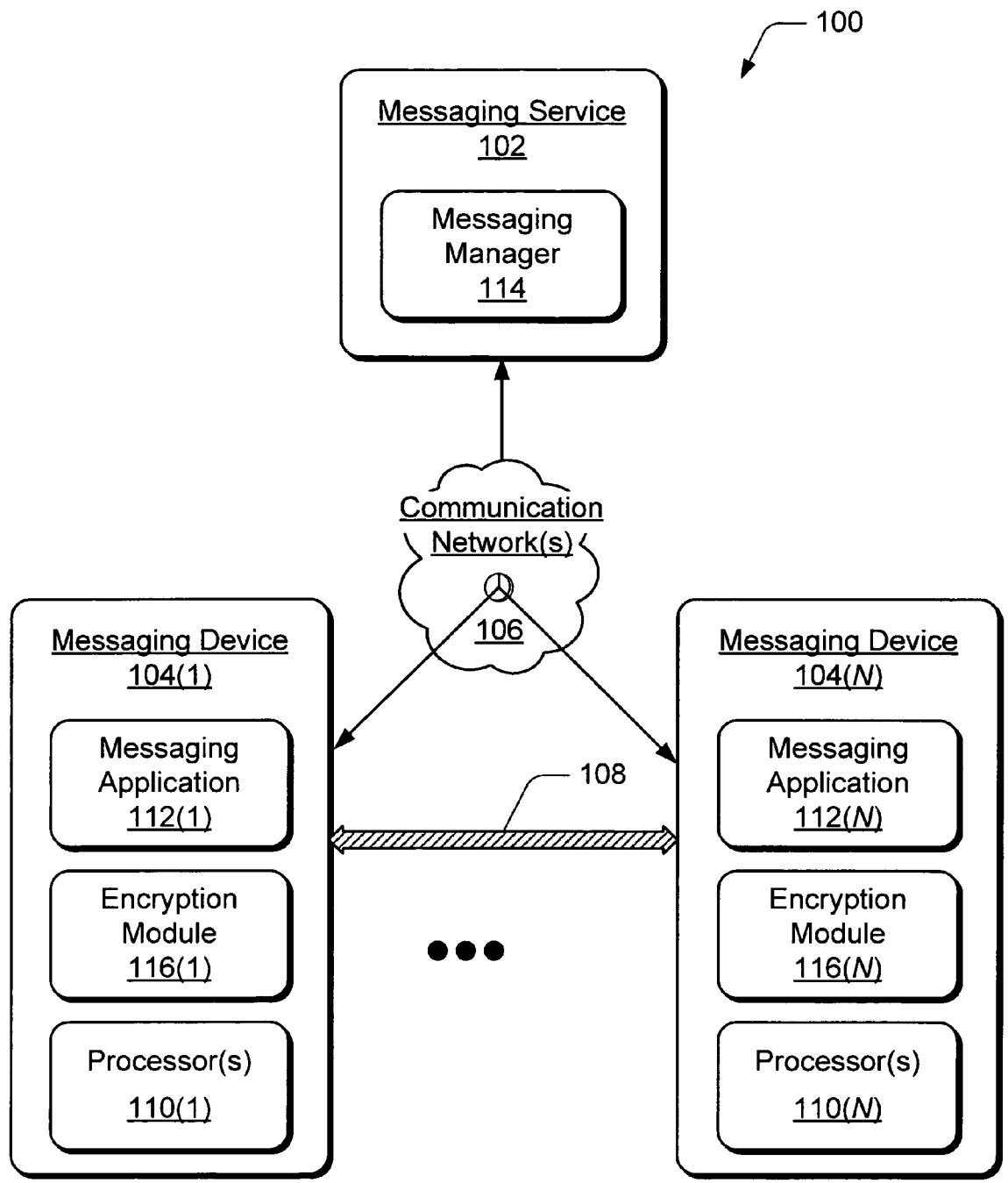
FIG. 1 illustrates an exemplary messaging system in which embodiments of secure instant messaging can be implemented.

FIG. 1 illustrates an exemplary messaging system 100 in which embodiments of secure instant messaging can be implemented. Messaging system 100 includes a messaging service 102 and any number of messaging-enabled devices 104(1-N). The messaging devices 104(1-N) are each configured for communication with the messaging service 102 via a communication network 106, such as an intranet, the Internet, or mobile network(s). The messaging service 102 and/or the messaging devices 104(1-N) can be implemented with any one or combination of the components as described with reference to the exemplary computing and/or messaging device 600 shown in FIG. 6.

For example, a messaging device 104 may be implemented in any number of embodiments to include a computing device, a mobile messaging device, an appliance device, a gaming system console, an entertainment system component, a cell phone, and as any other type of messaging device that may be implemented in a messaging system. The messaging devices 104(1-N) can also represent logical clients that may include a user at a messaging device 104, other devices, and/or software applications that implement embodiments of secure instant messaging.

The communication network(s) 106 can be implemented as any one or combination of a wide area network (WAN), a local area network (LAN), a wireless network, a public telephone network, an intranet, and the like. Although shown as a single communication network, the network(s) 106 can be implemented using any type of network topology and any network communication protocol, and can be represented or otherwise implemented as a combination of two or more networks. A digital network can include various hardwired and/or wireless links, routers, gateways, and so on to facilitate communication between the messaging service 102 and the client systems 104(1-N).

In this example, messaging device 104(1) and messaging device 104(N) are also configured for direct communication via a peer-to-peer network 108 by which the messaging devices 104(1-N) can exchange real-time communications, such as instant messages. The peer-to-peer network 108 can be implemented as a separate and independent communication link from the communication network(s) 106. Additionally, the peer-to-peer network 108 can be implemented using any type of network topology and any network communication protocol, and can be represented or otherwise implemented as a combination of two or more networks.

Each of the messaging devices 104(1-N) includes one or more processors 110(1-N) (e.g., any of microprocessors, controllers, and the like) which process various computer executable instructions to control the operation of a messaging device 104, to communicate with other electronic and computing devices, and to implement embodiments of secure instant messaging. Each of the messaging devices 104(1-N) also includes a respective messaging application 112(1-N) that is executable on a processor 110 such that messaging device 104(1) can participate in an instant messaging session with another messaging device, such as messaging device 104(N).

The messaging applications 112(1-N) provide that users at each of the respective messaging devices 104(1-N), when participating in an instant messaging session, can communicate with each other by way of instant text messages, multimedia exchange, voice communications, avatars (e.g., visual representations), and the like. The instant messages (or other communications) are exchanged via the peer-to-peer network 108 in real-time (or approximate real-time as there may be negligible delays in processing and data transfer). The instant messages are typically communicated in real-time, although delayed delivery may also be utilized, such as by logging the messages when a messaging device 104 is off-line or otherwise unavailable.

The messaging service 102 includes a messaging manager 114 which may, in some instances, be implemented to facilitate an instant messaging session between messaging devices 104(1-N). In an implementation, the messaging manager can route instant messages between the messaging devices 104(1-N), such as when messaging device 104(1) generates an instant message for communication to messaging device 104(N). The instant message is routed from messaging device 104(1) through a communication network 106 to the messaging manager 114 which then routes the instant message to messaging device 104(N) via communication network 106. Messaging device 104(N) receives the instant message and executes the messaging application 112(N) to display the instant message. Alternatively, the instant message can be communicated from messaging device 104(1) directly to messaging device 104(N) via the peer-to-peer network 108 without utilizing the messaging service 102.

Figure 2:
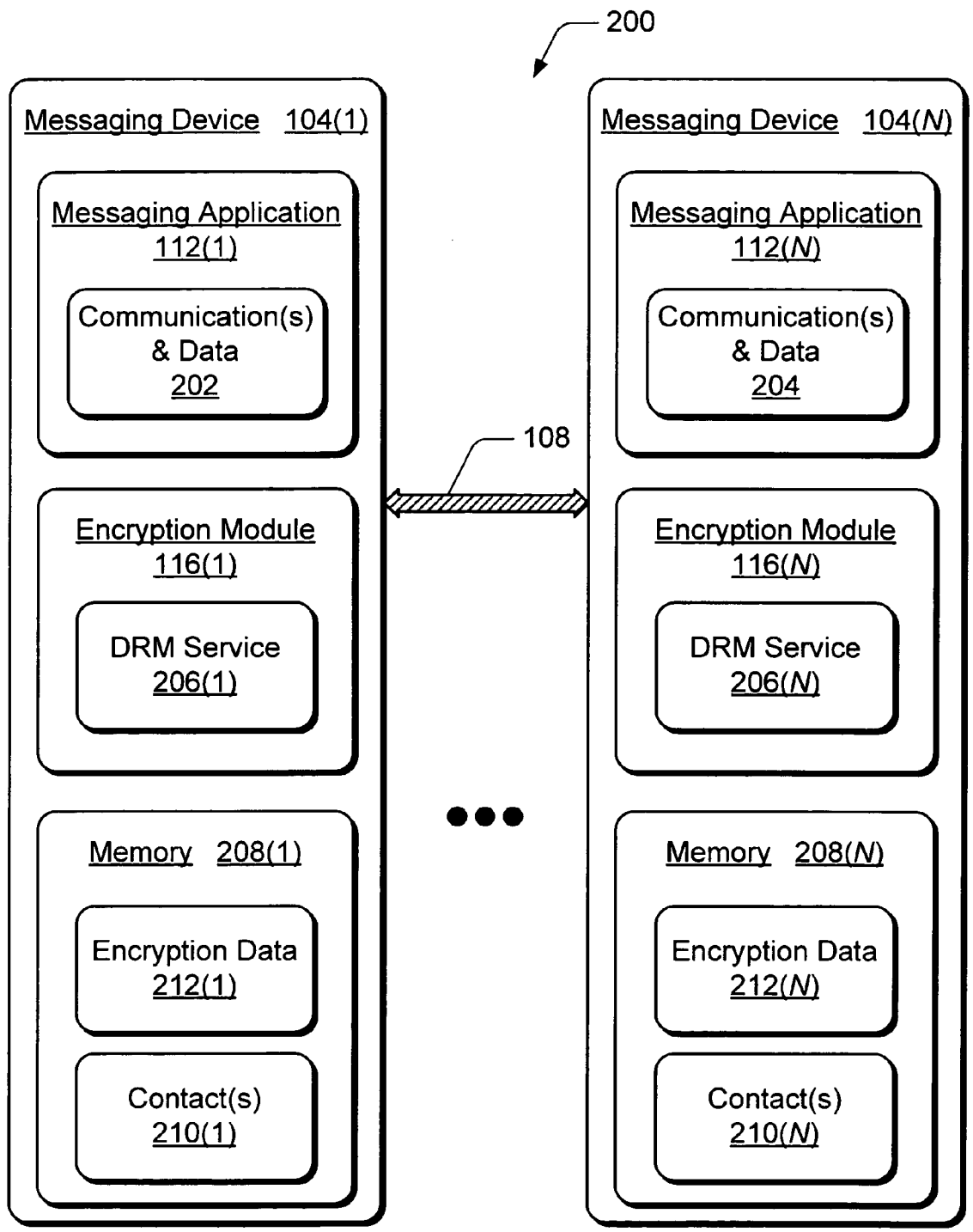
FIG. 2 illustrates another exemplary messaging system in which embodiments of secure instant messaging can be implemented, and that includes components of the messaging system shown in FIG. 1.
Figure 3:
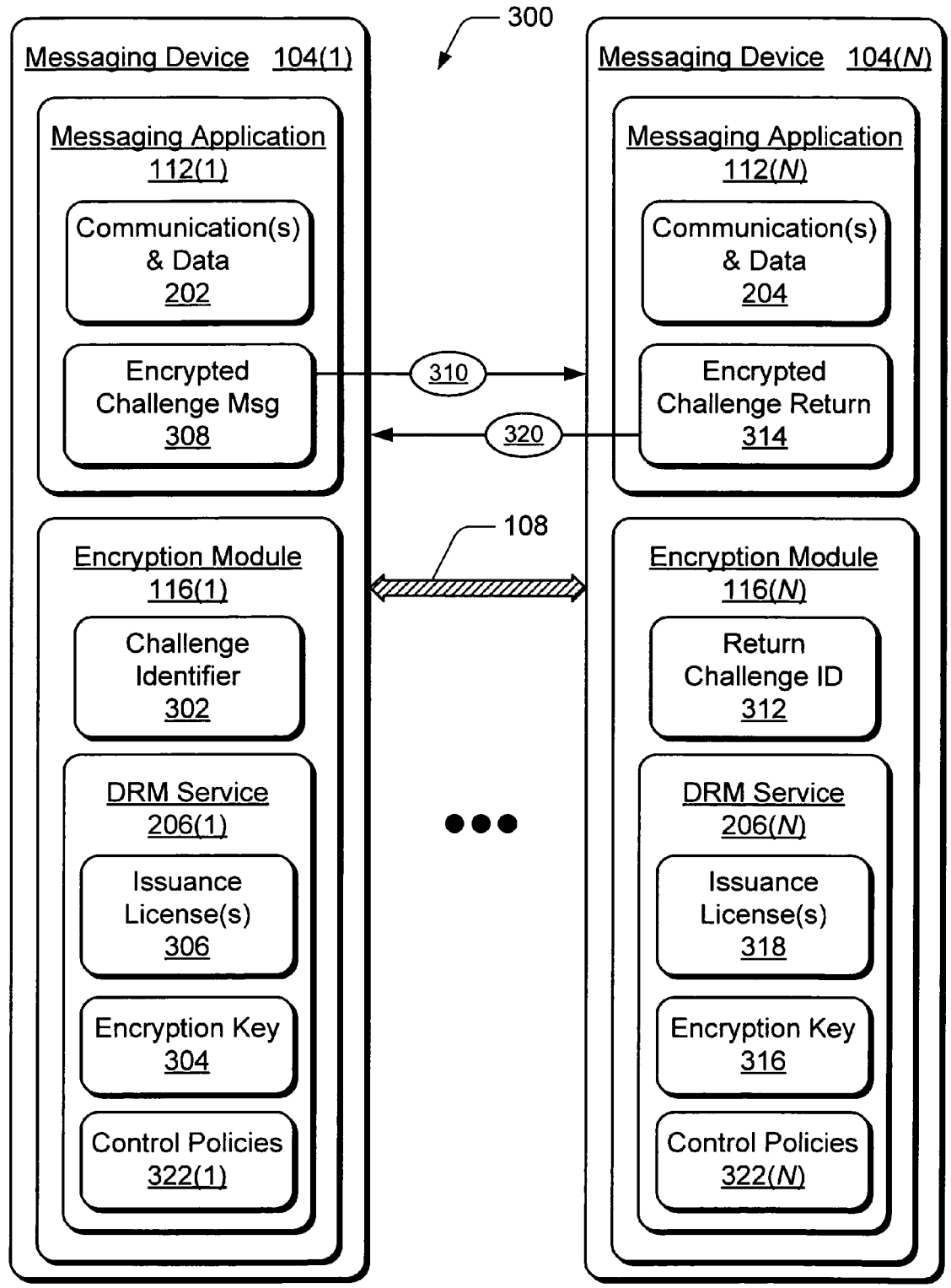
FIG. 3 illustrates another exemplary messaging system in which embodiments of secure instant messaging can be implemented, and that includes components of the messaging systems shown in FIGS. 1 and 2.

Each of the messaging devices 104(1-N) includes a respective encryption module 116(1-N) to implement embodiments of secure instant messaging as described further with reference to the exemplary messaging systems 200 and 300 shown in FIGS. 2 and 3. Although messaging system 100 illustrates an implementation of secure instant messaging, the environment is merely exemplary. The features of secure instant messaging described herein are platform-independent such that the instant messaging techniques may be implemented on a variety of commercial computing platforms having a variety of processors, memory components, and various other components.

For example, although a messaging application 112 and an encryption module 116 in a respective messaging device 104 are each shown as independent applications, a messaging application 112 can be implemented to include an encryption module 116 to form a multi-functional component of the messaging device 104. Further, although each of the messaging application 112 and the encryption module 116 in a respective messaging device 104 is illustrated and described as a single application configured to implement embodiments of secure instant messaging, either or both of the messaging application 112 and the encryption module 116 can be implemented as several component applications distributed to each perform one or more functions in a messaging device 104 and/or in a messaging system 100.

FIG. 2 illustrates an exemplary messaging system 200 in which embodiments of secure instant messaging can be implemented, and which includes components of messaging system 100 shown in FIG. 1. In system 200, the messaging devices 104(1-N) each include the respective messaging applications 112(1-N) and the encryption modules 116(1-N) as described above with reference to FIG. 1. Additionally, the messaging devices 104(1-N) are each implemented to communicate and exchange real-time communications, such as instant messages, via the peer-to-peer network 108.

The messaging application 112(1) at messaging device 104(1) includes and/or generates various communications and data 202, and similarly, the messaging application 112(N) includes and/or generates various communications and data 204. In various embodiments of secure instant messaging, the communications and data 202, 204 associated with the respective messaging applications 112(1-N) can include any one or combination of an instant message, a real-time peer-to-peer communication, a file transfer, an image transfer, a text-based communication, an audio communication, a video communication, or an audio/video communication, any of which may be communicated as an encrypted or otherwise secure communication via the peer-to-peer network 108.

In an embodiment, each of the encryption modules 116(1-N) in messaging devices 104(1-N) can include a respective digital rights management (DRM) service 206(1-N) that can be utilized to implement embodiments of secure instant messaging. Each of the messaging devices 104(1-N) include respective memory 208(1-N) to maintain contact(s) 210(1-N) and encryption data 212(1-N) for each respective messaging device 104(1-N). A memory 208 can be implemented as any type and combination of computer readable media as described with reference to the exemplary computing and/or messaging device 600 shown in FIG. 6.

The contact(s) 210 for a particular messaging device 104 can identify users of other messaging devices 104 that a user of the particular messaging device communicates with. For example, memory 208(1) in messaging device 104(1) can maintain a contact 210(1) that identifies messaging device 104(N) and/or a user at messaging device 104(N). Similarly, memory 208(N) in messaging device 104(N) can maintain a contact 210(N) that identifies messaging device 104(1) and/or a user at messaging device 104(1).

An encryption module 116 in a messaging device (e.g., messaging device 104(1)) can be implemented to validate an identity of a recipient messaging device (e.g., messaging device 104(N)) to establish that encrypted communications, such as instant messages, are secure when communicating via the peer-to-peer network 108 with the recipient messaging device. In an embodiment of secure instant messaging, the digital rights management service 206 is utilized to encrypt and exchange secure communications and instant messages, as described with reference to FIG. 3. Additionally, the digital rights management service 206 provides that identities of the messaging devices 104(1-N) are authenticated prior to establishing the peer-to-peer communication link 108, and issues usage and issuance licenses only to known and authenticated identities. Other rights management protocol(s) may also similarly be utilized to implement embodiments of secure instant messaging.

FIG. 3 illustrates an exemplary messaging system 300 in which embodiments of secure instant messaging can be implemented, and which includes components of the messaging systems 100 and 200 shown in FIGS. 1 and 2. In system 300, the messaging devices 104(1-N) each include the respective messaging applications 112(1-N) and the encryption modules 116(1-N) as described above with reference to FIGS. 1 and 2. Additionally, the messaging devices 104(1-N) are each implemented to communicate and exchange real-time communications, such as instant messages, via the peer-to-peer network 108.

In this example, messaging device 104(1) can validate an identity of messaging device 104(N) (also referred to herein as the recipient messaging device) to establish that encrypted communications 202 are secure when communicated from messaging device 104(1) to the recipient messaging device 104(N) via the peer-to-peer network 108. In an alternate embodiment, the digital rights management service 206 provides that identities of the messaging devices 104(1-N) are inherently authenticated for secure instant messaging communications.

The encryption module 116(1) at messaging device 104(1) can encrypt a randomly generated challenge identifier 302 to generate an encrypted challenge message 308. In an embodiment that utilizes the digital rights management service 206, the encryption module 116(1) at messaging device 104(1) can encrypt the randomly generated challenge identifier 302 with an encryption key 304 which is embedded in an issuance license 306 of the digital rights management service 206(1) to generate the encrypted challenge message 308. In an embodiment of secure instant messaging, the encryption key 304 can be implemented as a "self-trusting" key to establish a self-trusted peer-to-peer system for message communication between messaging devices 104(1-N).

The messaging application 112(1) of messaging device 104(1) communicates 310 the encrypted challenge message 308 to the messaging application 112(N) at the recipient messaging device 104(N) via the peer-to-peer network 108. The encryption module 116(N) at messaging device 104(N) decrypts the challenge (i.e., the encrypted challenge message 308) and, in response, encrypts the challenge identifier as a return challenge identifier 312 to generate an encrypted challenge return 314. In an embodiment that utilizes the digital rights management service 206, the return challenge identifier 312 is encrypted with an encryption key 316 which is embedded in the recipient messaging device's own version of an issuance license 318 of the digital rights management service 206(N).

The messaging application 112(N) of messaging device 104(N) communicates 320 the encrypted challenge return 314 to the messaging application 112(1) at the messaging device 104(1) via the peer-to-peer network 108. The encryption module 116(1) of messaging device 104(1) can decrypt the response (i.e., the encrypted challenge return 314) and verify that the received challenge identifier (i.e., the return challenge identifier 312) matches the challenge identifier 302 that was initially sent to the recipient messaging device 104(N). This establishes that each of the messaging devices 104(1-N) are secure in the other's identity, and that instant messages can be encrypted and securely communicated via the peer-to-peer network 108.

Messaging device 104(1) can now rely on messaging device 104(N) being able to decrypt messages sent directly via the peer-to-peer network 108, can decrypt messages received directly from messaging device 104(N) via the peer-to-peer network 108, and can rely on the established identity of messaging device 104(N) and/or a user at messaging device 104(N). Messaging device 104(1) can also assert that encrypted messages sent directly to messaging device 104(N) can be only be decrypted at messaging device 104(N). The messaging device 104(N) can initiate the same validation sequence as described above to ensure the identity of messaging device 104(1) and to retrieve the usage license to decrypt future communications from messaging device 104(1).

For example, the messaging application 112(1) at messaging device 104(1) can generate an instant message 202 for communication to messaging device 104(N). The encryption module 116(1) can encrypt the instant message 202 with the encryption key 304 embedded in the issuance license 306 that is associated with messaging device 104(N) to generate an encrypted communication. The messaging application 112

(1) can then communicate the encrypted communication to the recipient messaging device 104(N) via the peer-to-peer network 108.

The digital rights management service 206 associated with an encryption module 116 in a messaging device 104 can include control policies 322 (also referred to as "usage rights"), such as control policies 322(1-N) in the respective messaging devices 104(1-N). The control policies 322(1-N) can designate the extent to which a recipient messaging device, or a user of the recipient messaging device, can maintain a communication for future reference, use the communication, and/or distribute the communication after being decrypted. A control policy 322 may also preclude the distribution and/or use of the communication along with any additional data associated with the communication.

For example, messaging device 104(1) can encrypt an instant message 202 to generate an encrypted instant message that includes a control policy 322(1) to limit use of the instant message when received and decrypted at the recipient messaging device 104(N). The use of the instant message may be limited in that the recipient messaging device 104(N) can not save the message data off-line, may not print-screen the message, or copy and paste the content of the message. The control policy 322(1) may also restrict viewing the message and/or the message expires after a time duration and is erased.

Figure 4A:
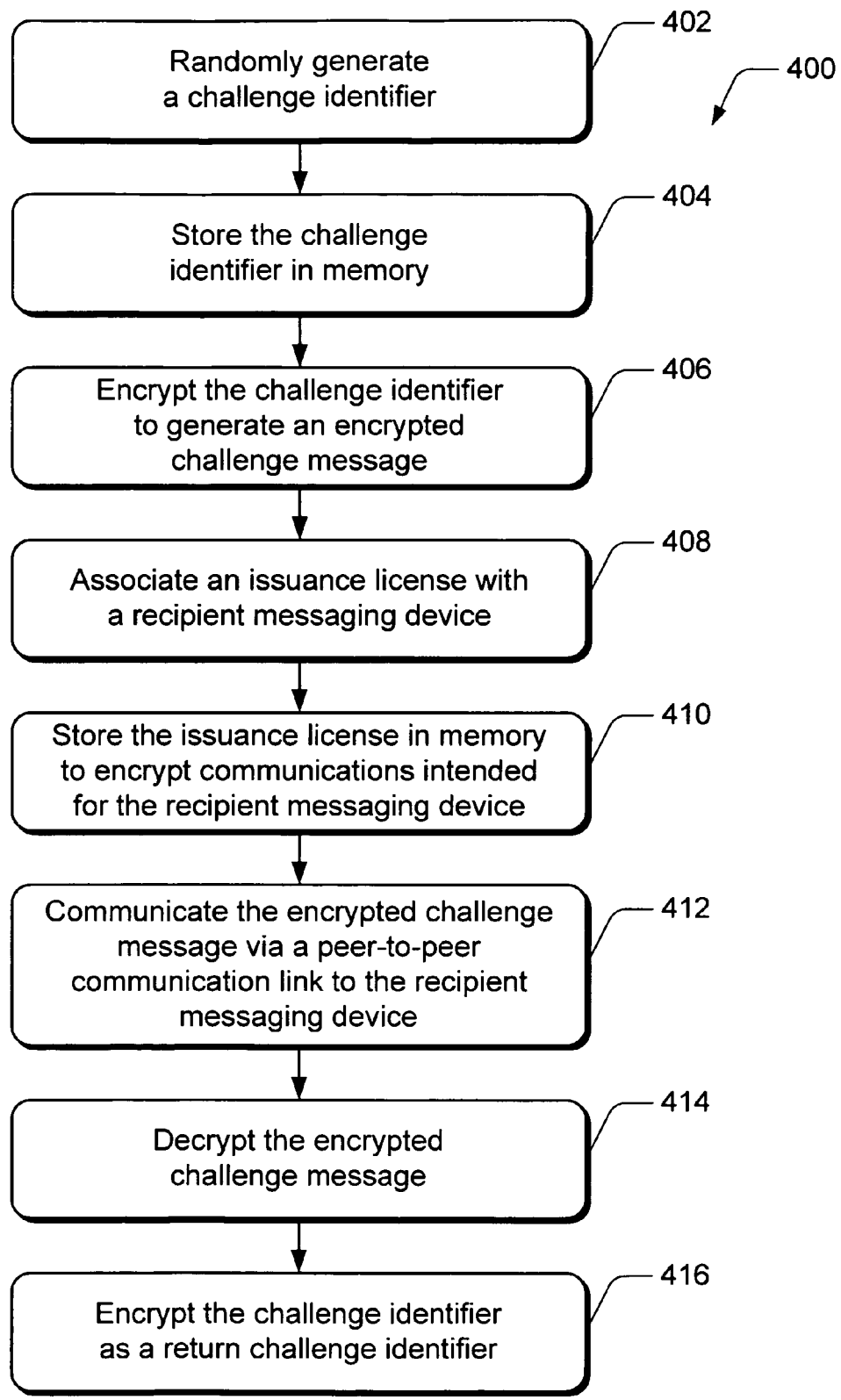
FIGS. 4(A-B) illustrate an exemplary method for secure instant messaging.
Figure 4B:
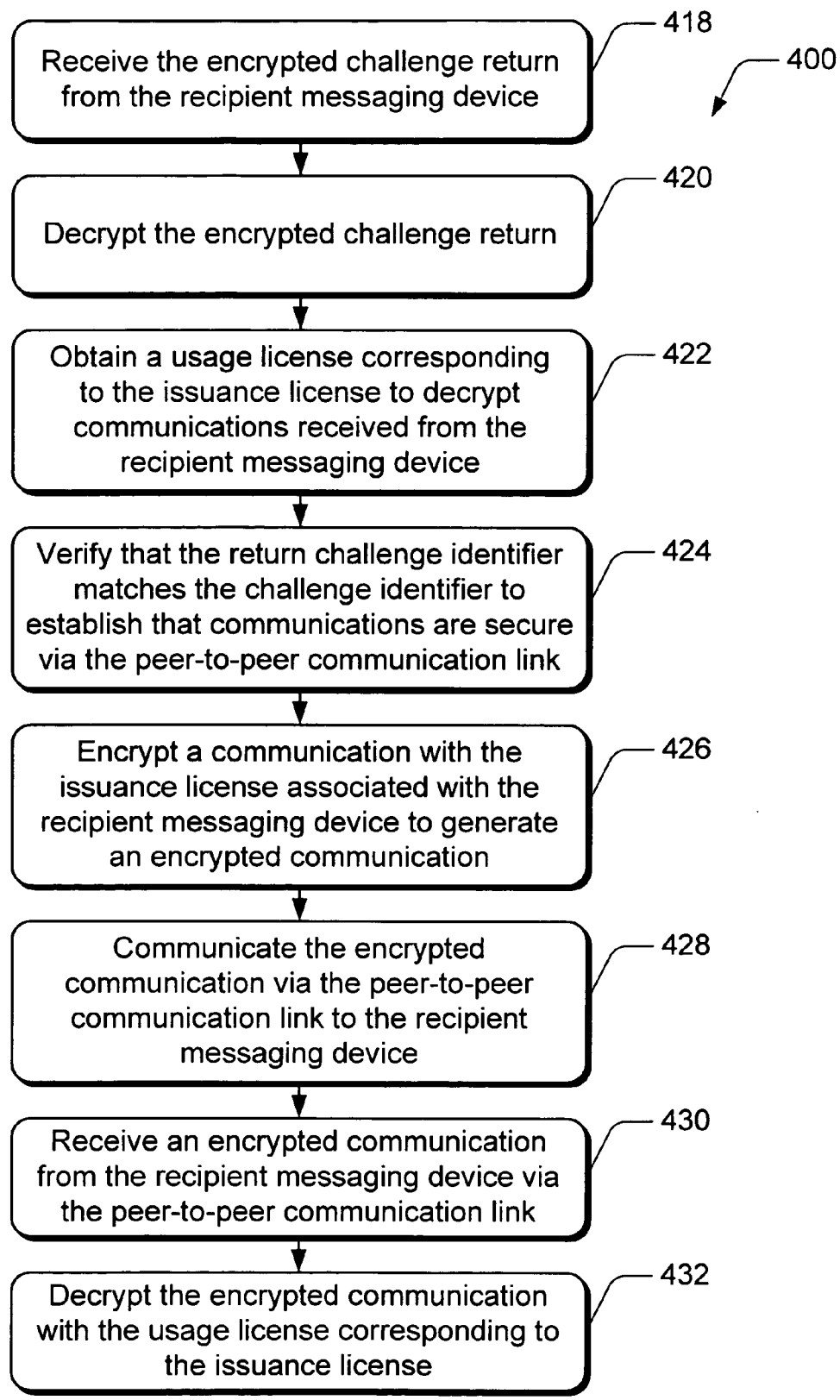

Methods for secure instant messaging, such as exemplary methods 400 and 500 described with reference to respective FIGS. 4(A-B) and 5 may be described in the general context of computer executable instructions. Generally, computer executable instructions can include routines, programs, objects, components, data structures, procedures, modules, functions, and the like that perform particular functions or implement particular abstract data types. The methods may also be practiced in a distributed computing environment where functions are performed by remote processing devices that are linked through a communications network. In a distributed computing environment, computer executable instructions may be located in both local and remote computer storage media, including memory storage devices.

FIGS. 4(A-B) illustrate an exemplary method 400 for secure instant messaging. The order in which the method is described is not intended to be construed as a limitation, and any number of the described method blocks can be combined in any order to implement the method. Furthermore, the method can be implemented in any suitable hardware, software, firmware, or combination thereof.

At block 402 (FIG. 4A), a challenge identifier is randomly generated and, at block 404, the challenge identifier is stored in memory. For example, encryption module 116(1) at messaging device 104(1) randomly generates challenge identifier 302 which can be stored in memory 208(1) as encryption data 212(1). At block 406, the challenge identifier is encrypted to generate an encrypted challenge message. For example, the encryption module 116(1) at messaging device 104(1) encrypts the randomly generated challenge identifier 302 to generate an encrypted challenge message 308. In an embodiment, the challenge identifier 302 can be encrypted with encryption key 304 which is embedded in an issuance license 306 of the digital rights management service 206(1) to generate the encrypted challenge message 308.

At block 408, the issuance license is associated with the recipient messaging device, and at block 410, the issuance license is stored in memory to encrypt communications intended for the recipient. For example, the issuance license 306 at messaging device 104(1) is associated with messaging device 104(N) and is stored in memory 208(1) for future reference. At block 412, the encrypted challenge message is communicated via a peer-to-peer communication link to the recipient messaging device. For example, messaging application 112(1) of messaging device 104(1) communicates 310 the encrypted challenge message 308 to the messaging application 112(N) at the recipient messaging device 104(N) via the peer-to-peer communication link 108.

At block 414, the encrypted challenge message is decrypted. For example, the encryption module 116(N) at the recipient messaging device 104(N) decrypts the encrypted challenge message 308. In an embodiment, the recipient messaging device 104(N) decrypts the encrypted challenge message 308 with a usage license that corresponds to the issuance license and which is obtained from the digital rights management service 206(N). At block 416, the challenge identifier is encrypted as a return challenge identifier to generate an encrypted challenge return. For example, encryption module 116(N) at messaging device 104(N) encrypts the challenge identifier as a return challenge identifier 312 to generate an encrypted challenge return 314. In an embodiment, the return challenge identifier 312 can be encrypted with an encryption key 316 which is embedded in the recipient messaging device's own version of an issuance license 318 of the digital rights management service 206(N).

At block 418 (FIG. 4B), the encrypted challenge return is received from the recipient messaging device. For example, the messaging application 112(1) of messaging device 104(1) receives the encrypted challenge return 314 from the messaging application 112(N) of messaging device 104(N) via the peer-to-peer communication link 108. At block 420, the encrypted challenge return is decrypted. For example, the encryption module 116(1) of messaging device 104(1) decrypts the encrypted challenge return 314 that is received 320 from the recipient messaging device 104(N).

At block 422, a usage license corresponding to the issuance license is obtained to decrypt communications received from the recipient messaging device. For example, a usage license corresponding to the issuance license 318 received from the recipient messaging device 104(N) is obtained and stored in memory 208(1) at messaging device 104(1) to decrypt future communications received from messaging device 104(N). At block 424, the return challenge identifier is verified to match the challenge identifier to establish that communications are secure when communicated via the peer-to-peer communication link. For example, encryption module 116(1) of messaging device 104(1) verifies that the return challenge identifier 312 matches the challenge identifier 302 that was initially sent to the recipient messaging device 104(N).

At block 426, a communication is encrypted with the issuance license associated with the recipient messaging device to generate an encrypted communication. For example, the messaging application 112(1) at messaging device 104(1) can generate an instant message 202 for communication to messaging device 104(N). At block 428, the encrypted communication is communicated via the peer-to-peer communication link to the recipient messaging device for real-time communication. For example, messaging application 112(1) communicates the encrypted communication to the recipient messaging device 104(N) via the peer-to-peer network 108 for (substantially) real-time communication. A secure communication communicated via the peer-to-peer communication link can include any one or combination of an instant message, a real-time peer-to-peer communication, a file transfer, an image transfer, a text-based communication, an audio communication, a video communication, or an audio/video communication.

At block 430, an encrypted communication is received from the recipient messaging device via the peer-to-peer communication link. For example, the messaging application 112(1) at messaging device 104(1) receives an encrypted communication 204 from messaging device 104(N) via the peer-to-peer communication link 108. At block 432, the encrypted communication is decrypted with the usage license corresponding to the issuance license received from the recipient messaging device with the encrypted challenge return. For example, the encryption module 116(1) decrypts the encrypted communication with a usage license that corresponds to the issuance license 318 which is received from the messaging device 104(N).

Figure 5:
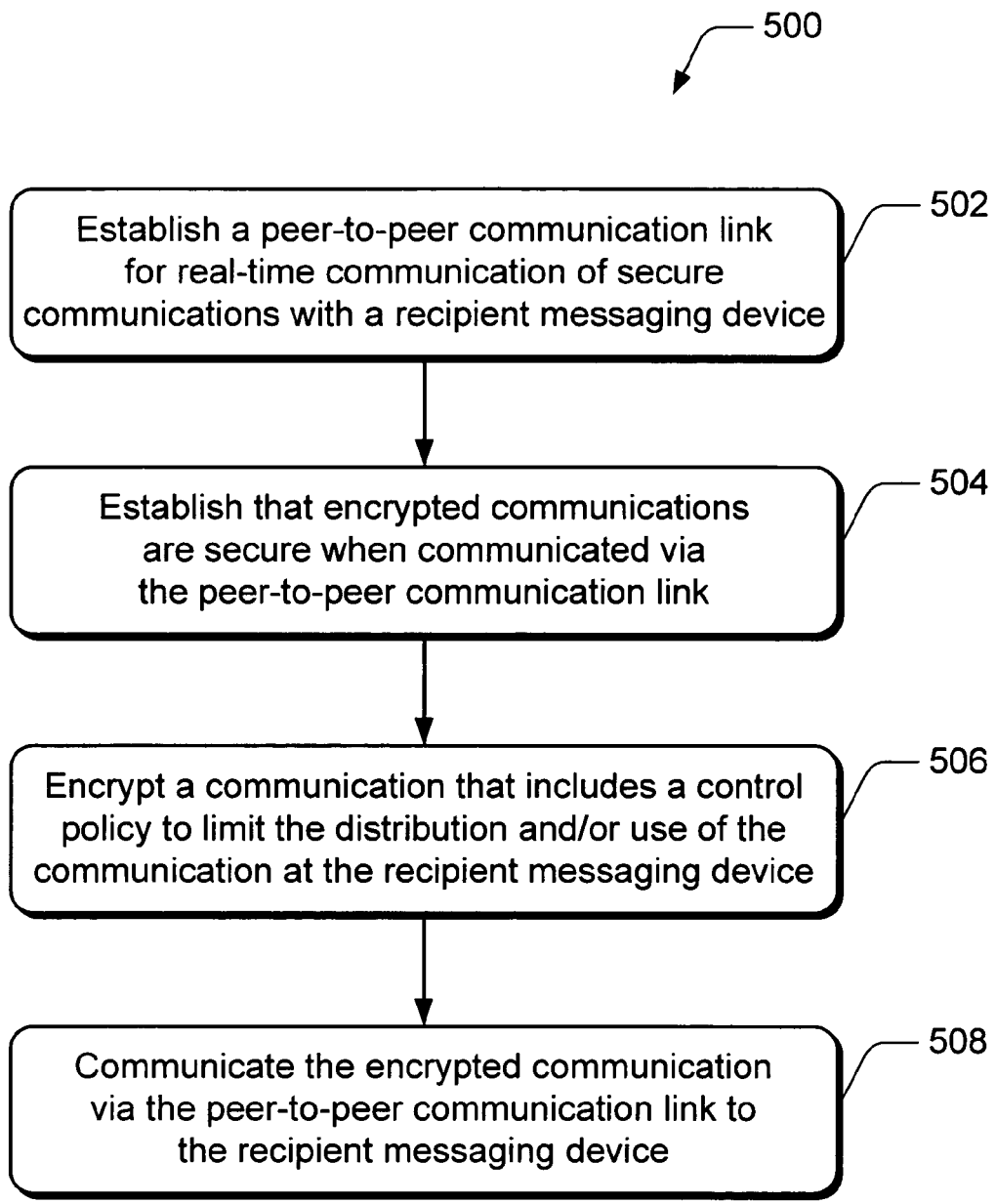
FIG. 5 illustrates another exemplary method for secure instant messaging.

FIG. 5 illustrates an exemplary method 500 for secure instant messaging. The order in which the method is described is not intended to be construed as a limitation, and any number of the described method blocks can be combined in any order to implement the method. Furthermore, the method can be implemented in any suitable hardware, software, firmware, or combination thereof.

At block 502, a peer-to-peer communication link is established for real-time communication of secure communications with a recipient messaging device. For example, messaging application 112(1) at messaging device 104(1) establishes the peer-to-peer communication link 108 for (substantially) real-time communication of secure communications 204 (e.g., instant messages). At block 504, encrypted communications are established to be secure when communicating via the peer-to-peer communication link with the recipient messaging device. This is described with reference to FIGS. 4(A-B).

At block 506, a communication is encrypted to include a control policy to limit the distribution and/or use of the communication when received at the recipient messaging device. For example, the messaging application 112(1) at messaging device 104(1) can encrypt an instant message 202 to generate an encrypted instant message that includes a control policy 322(1) to limit the distribution and/or use of the instant message when received and decrypted at the recipient messaging device 104(N).

In this example, a communication can include any one or combination of an instant message, a real-time peer-to-peer communication, a file transfer, an image transfer, a text-based communication, an audio communication, a video communication, or an audio/video communication. The control policy can designate the extent to which the recipient messaging device, or a user at the recipient messaging device, can maintain the communication for future reference, use, and/or distribute the communication after being decrypted. The control policy may also preclude the distribution of the communication along with any additional data associated with the communication, and may designate that a communication application at the recipient messaging device be validated by a digital rights management service to receive and decrypt the encrypted communication.

At block 508, the encrypted communication is communicated via the peer-to-peer communication link to the recipient messaging device. For example, the messaging application 112(1) at messaging device 104(1) can generate an instant message 202 having a control policy 322 for communication to messaging device 104(N). In an embodiment, the encryption module 116(1) can encrypt the instant message 202 with the issuance license 306 that is associated with messaging device 104(N) to generate an encrypted communication. The messaging application 112(1) can then communicate the encrypted communication to the recipient messaging device 104(N) via the peer-to-peer network 108.

Figure 6:
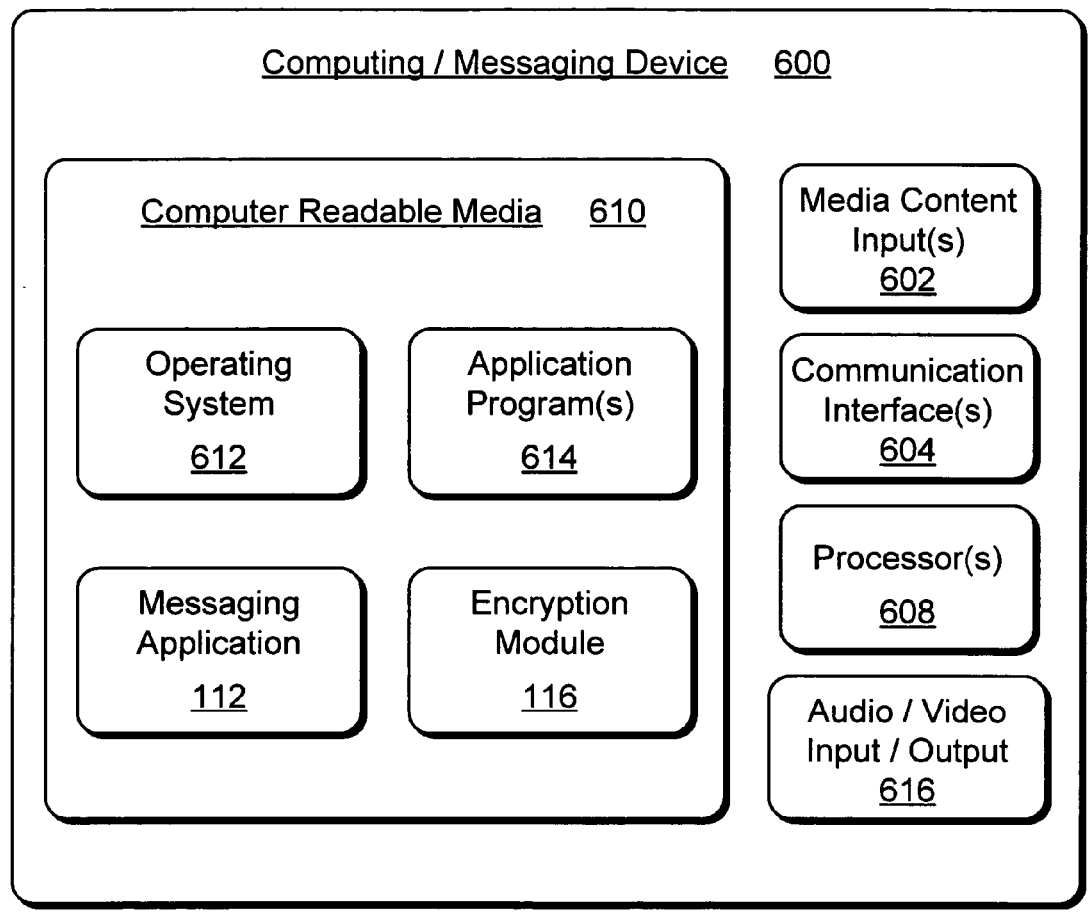
FIG. 6 illustrates various components of an exemplary computing device that can be implemented as any one or more of the messaging devices shown in FIGS. 1-3.

FIG. 6 illustrates various components of an exemplary computing and/or messaging device 600 in which embodiments of secure instant messaging can be implemented. Further, the computing and/or messaging device 600 can be implemented as any one or more of the messaging devices 104(1-N) described with reference to FIGS. 1-5.

Computing and/or messaging device 600 includes one or more media content inputs 602 which may include Internet Protocol (IP) inputs over which streams of media content are received via an IP-based network, an intranet, or the Internet. Device 600 further includes communication interface(s) 604 which can be implemented as any one or more of a serial and/or parallel interface, a wireless interface, any type of network interface, a modem, and as any other type of communication interface. A wireless interface enables device 600 to receive control input commands and other information from an input device, such as from remote control device, PDA (personal digital assistant), cellular phone, or from another infrared (IR), 802.11, Bluetooth, or similar RF input device.

A network interface provides a connection between the computing and/or messaging device 600 and a communication network (e.g., communication networks 106 or peer-to-peer network 108) by which other electronic, computing, and messaging devices can communicate data with device 600. Similarly, a serial and/or parallel interface provides for data communication directly between device 600 and the other electronic, computing, and/or messaging devices. A modem facilitates device 600 communication with other electronic and computing devices via a conventional telephone line, a DSL connection, cable, and/or other type of connection.

Computing and/or messaging device 600 also includes one or more processors 608 (e.g., any of microprocessors, controllers, and the like) which process various computer executable instructions to control the operation of device 600, to communicate with other electronic and computing devices, and to implement embodiments of secure instant messaging. Device 600 can be implemented with computer readable media 610, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer readable media 610 provides data storage mechanisms to store various information and/or data such as software applications and any other types of information and data related to operational aspects of the computing and/or messaging device 600. For example, an operating system 612 and/or other application programs 614 can be maintained as software applications with the computer readable media 610 and executed on processor(s) 608 to implement embodiments of secure instant messaging. For example, when implemented as a messaging device (e.g., any of messaging devices 104(1-N)), computer readable media 610 maintains a messaging application 112 and an encryption module 116 to implement embodiments of secure instant messaging.

The computing and/or messaging device 600 also includes an audio and/or video output 616 that provides audio and video to an audio rendering and/or display system that may be external or integrated with device 600, or to other devices that process, display, and/or otherwise render audio, video, and display data. Video signals and audio signals can be communicated from device 600 to a display device via an RF (radio frequency) link, S-video link, composite video link, component video link, analog audio connection, or other similar communication link. Although not shown, a user can interface with the device 600 via any number of different input devices such as a keyboard and pointing device (e.g., a "mouse"). Other input devices may include a microphone, joystick, game pad, controller, serial port, scanner, and/or any other type of input device that facilitates instant messaging.

Although embodiments of secure instant messaging have been described in language specific to structural features and/or methods, it is to be understood that the subject of the appended claims is not necessarily limited to the specific features or methods described. Rather, the specific features and methods and disclosed as exemplary implementations of secure instant messaging.

The invention claimed is:

1. A method, comprising:
    encrypting, by a sender messaging device, a challenge identifier that is stored in memory of the sender messaging device to generate an encrypted challenge message, wherein the encrypting is facilitated by an encryption module, the encryption module having initialized an encryption relationship with a recipient messaging device prior to the encrypting, and
    wherein the encrypting includes encrypting the challenge identifier with a first encryption key that is embedded in a first issuance license specific to the recipient messaging device;
    communicating, by the sender messaging device, the encrypted challenge message via a peer to peer communication link to the recipient messaging device that decrypts the encrypted challenge message and encrypts the challenge identifier as a return challenge identifier to generate an encrypted challenge return, the recipient messaging device encrypting the challenge identifier with a second encryption key that is embedded in a second issuance license specific to the sender messaging device, wherein the first and second encryption keys are different encryption keys;
    receiving, by the sender messaging device, the encrypted challenge return from the recipient messaging device;
    decrypting, by the sender messaging device, the encrypted challenge return; and
    verifying, by the sender messaging device, that the return challenge identifier matches the challenge identifier that is stored in the memory of the sender messaging device to establish that communications are secure when communicated via the peer-to-peer communication link.

2. A method as recited in claim 1, further comprising:
    randomly generating the challenge identifier; and
    storing the challenge identifier in memory.

3. A method as recited in claim 1, further comprising:
    storing the first issuance license in memory to encrypt communications intended for the recipient messaging device.

4. A method as recited in claim 1, further comprising:
    obtaining a usage license corresponding to the first issuance license; and
    storing the usage license to decrypt communications received from the recipient messaging device.

5. A method as recited in claim 1, further comprising:
    generating a communication to the recipient messaging device;
    encrypting the communication with the first encryption key to generate an encrypted communication; and
    communicating the encrypted communication via the peer-to-peer communication link to the recipient messaging device that decrypts the encrypted communication.

6. A method as recited in claim 1, further comprising:
    receiving an encrypted communication from the recipient messaging device via the peer to peer communication link; and
    decrypting the encrypted communication with a usage license that corresponds to the first issuance license.

7. A method as recited in claim 1, wherein the secure communications communicated via the peer to peer communication link include instant messages.

8. A method as recited in claim 1, wherein the secure communications communicated via the peer to peer communication link include substantially real time peer to peer communications.

9. A method as recited in claim 1, wherein the secure communications communicated via the peer-to-peer communication link include at least one of an instant message, a file transfer, an image transfer, a text based communication, an audio communication, a video communication, or an audio/video communication.

10. An instant messaging system, comprising:
    a peer-to-peer communication link; and
    a first messaging device configured to perform validation that encrypted instant messages are secure when communicated from the first messaging device to a second messaging device via the peer-to-peer communication link, wherein validation is facilitated by an encryption module, the encryption module having initialized an encryption relationship with the second messaging device prior to the validation, wherein:
    the first messaging device is further configured to encrypt a challenge identifier that is stored on the first messaging device with a first encryption key that is embedded in a first issuance license specific to the second messaging device to generate an encrypted challenge, and communicate the encrypted challenge via the peer-to-peer communication link to the second messaging device;
    the second messaging device is configured to decrypt the encrypted challenge, encrypt the challenge identifier as a return challenge identifier with a second encryption key that is embedded in a second issuance license specific to the first messaging device to generate an encrypted challenge return, and communicate the encrypted challenge return via the peer-to-peer communication link to the first messaging device;
    the first and second encryption keys being different encryption keys; and
    the first messaging device is further configured to decrypt the encrypted challenge return, and verify that the return challenge identifier matches the challenge identifier that is stored on the first messaging device to establish that the encrypted instant messages are secure when communicated via the peer-to-peer communication link.

11. An instant messaging system as recited in claim 10, wherein the first messaging device is further configured to establish that encrypted communications are secure when communicated via the peer-to-peer communication link, the encrypted communications including at least one of a file transfer, an image transfer, a text based communication, an audio communication, a video communication, or an audio/video communication.

12. An instant messaging system as recited in claim 10, wherein the second messaging device is configured to establish that encrypted instant messages are secure when communicated from the second messaging device to the first messaging device via the peer-to-peer communication link.

13. An instant messaging system as recited in claim 10, wherein the first messaging device is further configured to:

obtain a usage license corresponding to the first issuance license; and decrypt the encrypted challenge return with the usage license.

14. An instant messaging system as recited in claim 10, wherein the first messaging device is further configured to randomly generate the challenge identifier.

15. An instant messaging system as recited in claim 10, wherein the first messaging device is further configured to:

encrypt an instant message with the first encryption key to generate an encrypted instant message; and communicate the encrypted instant message to the second messaging device via the peer-to-peer communication link.

16. An instant messaging system as recited in claim 10, wherein the first messaging device is further configured to:

obtain a usage license corresponding to the first issuance license;

maintain the usage license to decrypt encrypted instant messages;

receive an encrypted instant message from the second messaging device via the peer to peer communication link; and decrypt the encrypted instant message with the usage license.

17. An article of manufacture comprising:

one or more computer readable media storing computer executable instructions that, when executed, direct an instant messaging device to:

encrypt a challenge identifier that is stored on the instant messaging device to generate an encrypted challenge message, wherein the encrypting is facilitated by an encryption module, the encryption module having initialized an encryption relationship with a recipient messaging device prior to the encrypting, and wherein the encrypting includes encrypting the challenge identifier with a first encryption key that is embedded in a first issuance license specific to the recipient messaging device;

communicate the encrypted challenge message via a peer to peer communication link to the recipient messaging device;

decrypt an encrypted challenge return from the recipient messaging device, the recipient messaging device having encrypted the challenge identifier with a second encryption key that is embedded in a second issuance license specific to the sender messaging device, wherein the first and second encryption keys are different encryption keys;

verify that a return challenge identifier received in the encrypted challenge return from the recipient messaging device matches the challenge identifier that is stored on the instant messaging device to establish that instant messages are secure when communicated via the peer-to-peer communication link;

generate an instant message for communication to the recipient messaging device;

encrypt the instant message with the first encryption key to generate an encrypted instant message;

communicate the encrypted instant message as a secure communication to the recipient messaging device via the peer-to-peer communication link;

receive a second encrypted instant message as a secure communication from the recipient messaging device via the peer to peer communication link; and decrypt the second encrypted instant message with a usage license corresponding to the first issuance license.

* * * * *